Jan. 22, 1929.
R. J. SCHEIBLI, JR
1,699,546
BRAKE ROD JAW CONNECTION
Filed Sept. 21, 1923
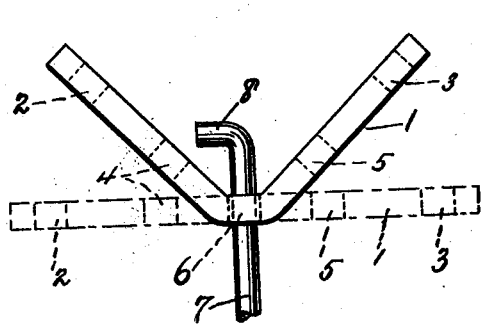
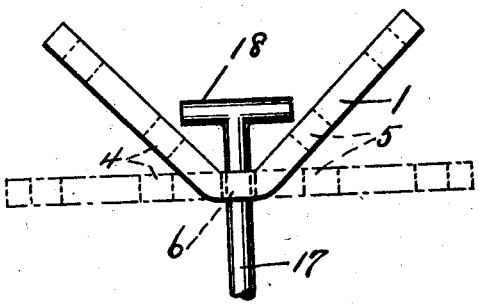
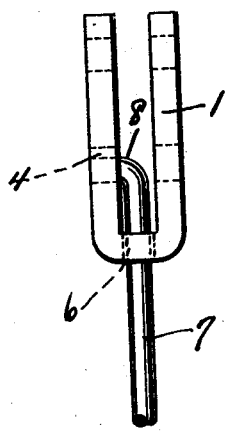
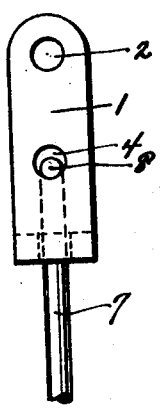
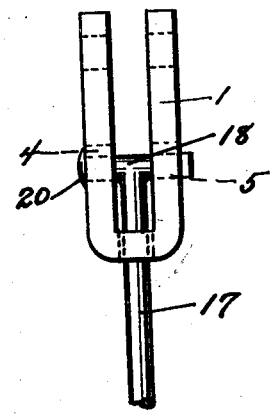
INVENTOR:
Robert J. Scheibli, Jr.
BY F. H. Libber
ATTORNEY Patented Jan. 22, 1929.

1,699,546

UNITED STATES PATENT OFFICE.

ROBERT J. SCHEIBLI, JR., OF ST. LOUIS, MISSOURI, ASSIGNOR TO AMERICAN CAR AND FOUNDRY COMPANY, OF NEW YORK, N. Y., A CORPORATION OF NEW JERSEY.

BRAKE-ROD-JAW CONNECTION.

Application filed September 21, 1923. Serial No. 664,118.

Reference is had to the accompanying drawings which illustrate the preferred form of the invention; though it is to be understood that the invention is not limited to the exact details of construction shown and described, as it is obvious that various modifications thereof within the scope of the claims will occur to persons skilled in the art.

In said drawings:

Fig. 1 is a view in elevation showing a brake rod jaw with a brake rod inserted in the jaw and headed and the jaw having its sides partly bent to their final position;

Fig. 2 is a front elevation of the finished jaw assembled with the brake rod;

Fig. 3 is a side elevation of the structure of Fig. 2;

Fig. 4 is a view similar to Fig. 1 showing a brake rod having a modified form of head; and Fig. 5 is a front elevation of a finished jaw assembled with the brake rod shown in Fig. 4.

It is an object of this invention to provide an improved brake rod jaw of the type formed of a unitary member bent to substantially a U-shape and used with a brake rod having a laterally projecting head, the brake rod being headed after being inserted in an opening in the jaw and the head being engaged in openings in the sides of the jaw as the jaw is given its final shape. It is also an object of this invention to provide an improved method of forming a jaw of the type described and securing it to the brake rod.

With these and other objects in view the invention comprises, as shown in the drawing, a member 1 of wrought iron or steel provided with a series of openings, the openings 2, 3 at the ends for use in connecting the jaw to the brake lever, the openings 4, 5 for use in connecting the brake rod to the jaw and an opening 6 in the bight portion in which the brake rod 7 is inserted. The member 1 is formed from sheet metal or from a metal bar and provided with the openings 2 to 6, inclusive, and then bent partly to a yoke or U-shape as shown in solid lines in Fig. 1. The brake rod 7 is then inserted in the opening 6 in the connective portion of the bent jaw blank and the rod is provided with a laterally projecting head 8 by bending a portion of the rod at right angles to the main body of the rod 7, the head usually being of sufficient length so that when inserted in an opening 4 or 5 in a side portion of the yoke or jaw formed from the blank, it will project slightly beyond the jaw side. The member 1 is then bent to its final or U-shape, as shown in Fig. 2, the head 8 of the rod being brought into engagement with one of the openings 4 or 5 as the rod is bent to shape.

In the modified structure shown in Figs. 4 and 5 the rod 17 is shown provided with a head 18 which projects on opposite sides of the rod 17 forming with the rod 17 a T. The rod 17 is inserted in the opening 6 of the member 1 and the head 18 formed thereon after the rod is in the member 1, the member 1 being then bent to its final or U-shape with the head 18 engaging in the openings 4 and 5 formed in the rod. Where the end of the T-head 18 projects beyond the jaw, as shown in Fig. 5, it may be provided with a head as shown at 20 thereby riveting or securing the head 18 in the yoke or jaw. It will be noted, however, that the brake rod 7 is secured in the jaw member 1 and can not be removed save by partially straightening the member 1 and removing the head from the rod 7 whether the head be riveted, as at 20, or not.

What is claimed is:

1. In a brake rod jaw construction, a yoke comprising a substantially U-shaped element having a perforation in its bight portion and aligned perforations formed in the sides thereof, a rod positioned in the perforation in said bight portion and extending between the sides of the U-shaped element, and a head formed at the end of the rod and extending into the perforations in the sides of the U-shaped element.

2. In a brake rod jaw construction a U-shaped member providing spaced parallel jaw portions having alined apertures and an apertured connecting piece, a rod extending through the connecting piece, a head formed at the end of said rod and extended into the alined apertures and provided with retaining means at one end to secure said head to the jaw portions.

In witness whereof I have hereunto set my hand.

ROBERT J. SCHEIBLI, Jr.